(12) United States Patent
Rose et al.

(10) Patent No.: US 12,470,231 B2
(45) Date of Patent: Nov. 11, 2025

(54) METHOD AND APPARATUS TO PERFORM CYCLIC REDUNDANCY CHECK TRAINING IN A MEMORY MODULE

(71) Applicant: Intel Corporation, Santa Clara, CA (US)

(72) Inventors: Tonia M. Rose, Wendell, NC (US); Saravanan Sethuraman, Bayan Lepas (MY)

(73) Assignee: Intel Corporation, Santa Clara, CA (US)

( * ) Notice: Subject to any disclaimer, the term of this patent is extended or adjusted under 35 U.S.C. 154(b) by 735 days.

(21) Appl. No.: 17/688,125

(22) Filed: Mar. 7, 2022

(65) Prior Publication Data
US 2022/0190844 A1 Jun. 16, 2022

(51) Int. Cl.
*H03M 13/09* (2006.01)
*G06F 13/16* (2006.01)
*H03M 13/00* (2006.01)

(52) U.S. Cl.
CPC ........ *H03M 13/09* (2013.01); *G06F 13/1673* (2013.01); *G06F 13/1684* (2013.01); *H03M 13/611* (2013.01)

(58) Field of Classification Search
CPC . H03M 13/09; H03M 13/611; G06F 13/1673; G06F 13/1684
See application file for complete search history.

(56) References Cited

U.S. PATENT DOCUMENTS

| | | | |
|---|---|---|---|
| 7,068,064 B1 | 6/2006 | Yen | |
| 7,432,731 B2 | 10/2008 | Bains et al. | |
| 7,602,056 B2 | 10/2009 | Zhao et al. | |
| 8,819,474 B2 | 8/2014 | Schoenborn et al. | |
| 8,996,934 B2 | 3/2015 | Mozak et al. | |
| 9,021,154 B2 | 4/2015 | Morris et al. | |
| 9,025,399 B1 | 5/2015 | Morris et al. | |
| 9,026,725 B2 | 5/2015 | Kostinsky et al. | |
| 9,471,094 B1 | 10/2016 | Brahmadathan et al. | |
| 9,558,850 B1 | 1/2017 | Bialas, Jr. et al. | |
| 9,627,029 B2 | 4/2017 | Morris et al. | |
| 10,148,416 B2 | 12/2018 | Morris et al. | |
| 10,416,912 B2 | 9/2019 | Morris et al. | |
| 10,884,958 B2 | 1/2021 | Agarwal et al. | |
| 11,061,590 B2 | 7/2021 | Morris et al. | |
| 2006/0188045 A1 | 8/2006 | Nygaard | |

(Continued)

FOREIGN PATENT DOCUMENTS

| | | |
|---|---|---|
| JP | 2011528837 A | 11/2011 |
| JP | 2016197275 A | 11/2016 |

OTHER PUBLICATIONS

JEDEC Standard, "DDR4 Data Buffer Definition (DDR4DB02)", JEDEC Solid State Technology Association, JESD82-32A (Revision of JESD82-32, Nov. 2016), Aug. 2019, 200 pages.

*Primary Examiner* — Thien Nguyen

(74) *Attorney, Agent, or Firm* — Compass IP Law PC

(57) ABSTRACT

A differential Data Strobe (DQS) signal is used to transmit and receive Cyclic Redundancy Check (CRC) between a host memory controller and a memory module. The differential DQS strobe signal is trained before it is used for transactions. The training is performed by sending and receiving a CRC pattern on the differential DQS strobe signal between the host memory controller and a buffer in the memory module.

20 Claims, 8 Drawing Sheets

(56) References Cited

U.S. PATENT DOCUMENTS

| | | |
|---|---|---|
| 2009/0110116 A1 | 4/2009 | Hollis |
| 2009/0244997 A1 | 10/2009 | Searles et al. |
| 2010/0228891 A1* | 9/2010 | Talbot ................. G06F 13/1673 710/33 |
| 2012/0257459 A1 | 10/2012 | Berke |
| 2013/0249107 A1 | 9/2013 | Jeon et al. |
| 2014/0181391 A1 | 6/2014 | Malladi et al. |
| 2014/0181392 A1 | 6/2014 | Malladi et al. |
| 2014/0281392 A1 | 9/2014 | Tuck et al. |
| 2015/0365104 A1* | 12/2015 | Jeong ................. G06F 11/1004 714/807 |
| 2017/0110165 A1 | 4/2017 | Kim et al. |
| 2017/0110169 A1 | 4/2017 | Kim et al. |
| 2018/0102150 A1 | 4/2018 | Choi et al. |
| 2018/0121123 A1 | 5/2018 | Morris et al. |
| 2018/0122486 A1 | 5/2018 | Choi et al. |
| 2021/0091791 A1* | 3/2021 | Cha ....................... H03M 13/09 |
| 2021/0279128 A1 | 9/2021 | McCall et al. |

* cited by examiner

METHOD AND APPARATUS TO PERFORM CYCLIC REDUNDANCY CHECK TRAINING IN A MEMORY MODULE

FIELD

This disclosure relates to a memory module and in particular to Cyclic Redundancy Check Write and Read Training of a CRC lane on the memory module.

BACKGROUND

A memory module is a printed circuit board on which memory integrated circuits ("chips") are mounted to another printed circuit board, such as a motherboard, via a connector (also referred to as a "socket"). The connector is installed on the motherboard and a memory module is inserted into the connector. The connector enables interconnection between a memory module and a circuit on the motherboard.

A dual in-line memory module (DIMM) has separate electrical contacts on each side of the memory module. A memory rank is a set of memory chips connected to the same chip select. A single-rank DIMM has one set of memory integrated circuits that is accessed while writing to or reading from the memory. A dual-rank DIMM is equivalent to two single-rank DIMMs on the same module, with only one rank accessible at a time. A quad-rank DIMM is equivalent to two dual-rank DIMMs on the same module.

Load Reduced Double Data Rate Dual In-Line Memory Module (LR-DIMM) modules reduce the electrical loading on the memory bus by including a data buffer. The data buffer increases the memory bus speed by reducing the load for data input.

BRIEF DESCRIPTION OF THE DRAWINGS

Features of embodiments of the claimed subject matter will become apparent as the following detailed description proceeds, and upon reference to the drawings, in which like numerals depict like parts, and in which:

Figure 1:
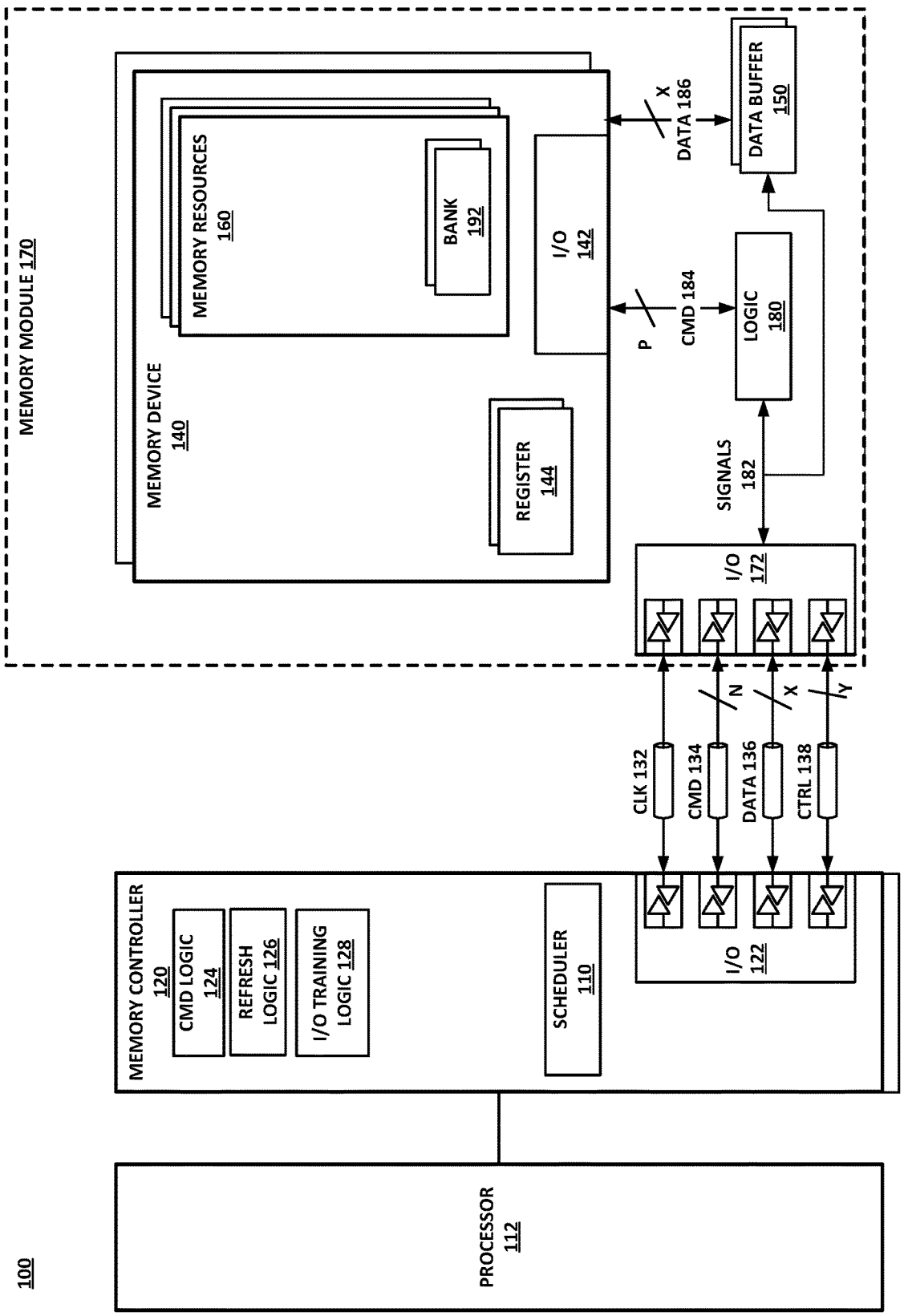
FIG. 1 is a block diagram of an embodiment of a system with a memory subsystem in which Cyclic Redundancy Check Write and Read Training can be performed.

Although the following Detailed Description will proceed with reference being made to illustrative embodiments of the claimed subject matter, many alternatives, modifications, and variations thereof will be apparent to those skilled in the art. Accordingly, it is intended that the claimed subject matter be viewed broadly, and be defined as set forth in the accompanying claims.

DESCRIPTION OF EMBODIMENTS

The Load Reduced Double Data Rate Dual In-Line Memory Module (LR-DIMM) includes DRAM integrated circuits that can have 4 DQ (data) signals (x4) or 8 DQ (data) signals (x8). Two differential DQS strobe signals can be used to sample the 8 DQ signals with one differential DQS Strobe signal used to sample each group of 4 DQ signals.

An LR-DIMM with DRAM integrated circuits that have 8 DQ signals can use one of the two differential DQS strobe signals to sample the 8 DQ signals. The other differential DQS strobe signal (referred to as a differential CRC\DQS strobe signal) can be used to support Cyclic Redundancy Check (CRC) to transmit Cyclic Redundancy Check (CRC) bits between a host memory controller and the LR-DIMM for both write and read of the DRAM integrated circuits on the LR-DIMM. The CRC bits transmitted on the differential CRC/DQS strobe signal are used to improve reliability of a memory subsystem that includes the DRAM integrated circuits.

The differential CRC/DQS strobe signal used to transmit CRC bits operates at the same speed as the DQ signals. Thus, the differential CRC/DQS strobe signal must be trained before it is used for read and write of the DRAM integrated circuits.

The differential DQS strobe signal used to transmit CRC bits is trained before it is used for transactions. The training is performed by sending and receiving a CRC pattern on the differential CRC/DQS strobe signal used to transmit CRC bits between the host memory controller and a buffer in the LR-DIMM. In another embodiment the memory module 170 can be a Registered DIMM (RDIMM).

Errors that are detected while the training is performed can be counted and returned to the host memory controller. The host-side interface can be retrained without disturbing the DRAM integrated circuits.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

FIG. 1 is a block diagram of an embodiment of a system 100 with a memory subsystem in which Cyclic Redundancy Check Write and Read Training can be performed. The system 100 includes at least one memory module 170 coupled to a memory controller 120. The memory controller 120 includes command logic 124, refresh logic 126, a scheduler 110 and I/O training logic 128.

System 100 includes a processor 112 and elements of a memory subsystem in a computing device. Processor 112 represents a processing unit of a computing platform that can execute an operating system (OS) and applications, which can collectively be referred to as the host or user of the memory. The OS and applications execute operations that result in memory accesses. Processor 112 can include one or more separate processors. Each separate processor can include a single processing unit, a multicore processing unit, or a combination. The processing unit can be a primary processor such as a CPU (central processing unit), a peripheral processor such as a GPU (graphics processing unit), or a combination. Memory accesses may also be initiated by devices such as a network controller or storage controller. Such devices can be integrated with the processor in some systems (for example, in a System-on-Chip (SoC)) or attached to the processer via a bus (e.g., Peripheral Component Interconnect express (PCIe)), or a combination.

Reference to memory devices can apply to volatile memory technologies or nonvolatile memory technologies. Descriptions herein referring to a "RAM" or "RAM device" can apply to any memory device that allows random access, whether volatile or nonvolatile. Descriptions referring to a "DRAM" or a "DRAM device" can refer to a volatile random access memory device. The memory device or DRAM can refer to the die itself, to a packaged memory product that includes one or more dies, or both. In one embodiment, a system with volatile memory that needs to be refreshed can also include nonvolatile memory.

Volatile memory is memory whose state (and therefore the data stored in it) is indeterminate if power is interrupted to the device. Dynamic volatile memory requires refreshing the data stored in the device to maintain state. One example of dynamic volatile memory incudes DRAM (Dynamic Random Access Memory), or some variant such as Synchronous DRAM (SDRAM). A memory subsystem as described herein may be compatible with a number of memory technologies, such as DDR3 (Double Data Rate version 3, original release by JEDEC (Joint Electronic Device Engineering Council) on Jun. 27, 2007). DDR4 (DDR version 4, originally published in September 2012 by JEDEC), DDR5 (DDR version 5, originally published in July 2020), LPDDR3 (Low Power DDR version 3, JESD209-3B, August 2013 by JEDEC), LPDDR4 (LPDDR version 4, JESD209-4, originally published by JEDEC in August 2014), LPDDR5 (LPDDR version 5, JESD209-5A, originally published by JEDEC in January 2020), WIO2 (Wide Input/Output version 2, JESD229-2 originally published by JEDEC in August 2014), HBM (High Bandwidth Memory, JESD235, originally published by JEDEC in October 2013), HBM2 (HBM version 2, JESD235C, originally published by JEDEC in January 2020), or HBM3 (HBM version 3 currently in discussion by JEDEC), or others or combinations of memory technologies, and technologies based on derivatives or extensions of such specifications. The JEDEC standards are available at www.jedec.org.

Memory controller 120 represents one or more memory controller circuits or devices for system 100. Memory controller 120 represents control logic that generates memory access commands in response to the execution of operations by processor 112. Memory controller 120 accesses one or more memory devices 140. Memory devices 140 can be DRAM devices in accordance with any referred to above. Memory controller 120 includes I/O interface logic 122 to couple to a memory bus. I/O interface logic 122 (as well as I/O interface logic 142 of memory device 140) can include pins, pads, connectors, signal lines, traces, or wires, or other hardware to connect the devices, or a combination of these. I/O interface logic 122 can include a hardware interface. As illustrated, I/O interface logic 122 includes at least drivers/transceivers for signal lines. Commonly, wires within an integrated circuit interface couple with a pad, pin, or connector to interface signal lines or traces or other wires between devices. I/O interface logic 122 can include drivers, receivers, transceivers, or termination, or other circuitry or combinations of circuitry to exchange signals on the signal lines between the devices.

The exchange of signals includes at least one of transmit or receive. While shown as coupling I/O interface logic 122 from memory controller 120 to I/O interface logic 142 of memory device 140, it will be understood that in an implementation of system 100 where groups of memory devices 140 are accessed in parallel, multiple memory devices can include I/O interfaces to the same interface of memory controller 120. In an implementation of system 100 including one or more memory modules 170, I/O interface logic 142 can include interface hardware of the memory module in addition to interface hardware on the memory device itself. Other memory controllers 120 can include separate interfaces to other memory devices 140.

The bus between memory controller 120 and memory devices 140 can be a double data rate (DDR) high-speed DRAM interface to transfer data that is implemented as multiple signal lines coupling the memory controller 120 to memory devices 140. The bus may typically include at least clock (CLK) 132, command/address (CMD) 134, and data (write data (DQ) and read data (DQ) 136, and zero or more control signal lines 138. In one embodiment, a bus or connection between memory controller 120 and memory can be referred to as a memory bus. The signal lines for CMD can be referred to as a "C/A bus" (or ADD/CMD bus, or some other designation indicating the transfer of commands (C or CMD) and address (A or ADD) information) and the signal lines for data (write DQ and read DQ) can be referred to as a "data bus." It will be understood that in addition to the lines explicitly shown, a bus can include at least one of strobe signaling lines (for example, data strobe (DQS)), alert lines, auxiliary lines, or other signal lines, or a combination. It will also be understood that serial bus technologies can be used for the connection between memory controller 120 and memory devices 140. An example of a serial bus technology is 8B10B encoding and transmission of high-speed data with embedded clock over a single differential pair of signals in each direction.

In one embodiment, one or more of CLK 132, CMD 134, or control signal lines 138 can be routed to memory devices 140 through logic 180. Each memory device 140 has a data buffer 150. Data 136 ((write data (DQ) and read data (DQ)) and strobe signaling lines (for example, data strobe (DQS)) are routed through the data buffer 150 to/from the memory device 140. The data buffer 150 reduces the loading on the data signals to I/O interface 122, which allows faster signaling or reduced errors or both. The reduced loading can be because I/O interface 122 sees only the termination of one or more data signals at data buffer 150, instead of termination of the data signal lines at every one of memory devices 140 in parallel. While I/O interface logic 142 is not specifically illustrated to include drivers or transceivers, it will be understood that I/O interface logic 142 includes hardware necessary to couple to the signal lines. Additionally, for purposes of simplicity in illustrations, I/O interface logic 142 does not illustrate all signals corresponding to what is shown with respect to I/O interface 122. In one embodiment, all signals of I/O interface 122 have counterparts at I/O interface logic 142. Some or all of the signal lines interfacing I/O interface logic 142 can be provided from logic 180 or data buffer 150. In one embodiment, certain signals from I/O interface 122 do not directly couple to I/O interface logic 142, but couple through logic 180 or data buffer 150, while one or more other signals may directly couple to I/O interface logic 142 from I/O interface 122 via I/O interface 172, but without being buffered through logic 180 or data buffer 150. Signals 182 represent the signals that interface with memory devices 140 through logic 180 or data buffer 150.

It will be understood that in the example of system 100, the bus between memory controller 120 and memory devices 140 includes a subsidiary command bus CMD 134 and a subsidiary data bus 136. In one embodiment, the subsidiary data bus 136 can include bidirectional lines for read data and for write/command data. In another embodiment, the subsidiary data bus 136 can include unidirectional write signal lines for write and data from the host to memory, and can include unidirectional lines for read data from the memory device 140 to the host. In accordance with the chosen memory technology and system design, control signal lines 138 may accompany a bus or sub bus, such as strobe lines DQS. Based on design of system 100, or implementation if a design supports multiple implementations, the data bus can have more or less bandwidth per memory device 140. For example, the data bus can support memory devices 140 that have either a x32 interface, a x16 interface, a x8 interface, a x4 interface or another interface. The convention "xW," where W is an integer that refers to an interface size or width of the interface of memory device 140, which represents a number of signal lines to exchange data with memory controller 120. The number is often binary, but is not so limited. The interface size of the memory devices is a controlling factor on how many memory devices can be used concurrently in system 100 or coupled in parallel to the same signal lines. In one embodiment, high bandwidth memory devices, wide interface devices, or stacked memory configurations, or combinations, can enable wider interfaces, such as a x128 interface, a x256 interface, a x512 interface, a x1024 interface, or other data bus interface width.

Memory devices 140 represent memory resources for system 100. In one embodiment, each memory device 140 is a separate memory die. Each memory device 140 includes I/O interface logic 142, which has a bandwidth determined by the implementation of the device (e.g., x16, x8, x4 or some other interface bandwidth). I/O interface logic 142 enables each memory device 140 to interface with memory controller 120. I/O interface logic 142 can include a hardware interface, and can be in accordance with I/O interface logic 122 of memory controller 120, but at the memory device end. In one embodiment, multiple memory devices 140 are connected in parallel to the same command and data buses. In another embodiment, multiple memory devices 140 are connected in parallel to the same command bus, and are connected to different data buses. For example, system 100 can be configured with multiple memory devices 140 coupled in parallel, with each memory device responding to a command, and accessing memory resources 160 internal to each. For a write operation, an individual memory device 140 can write a portion of the overall data word, and for a read operation, an individual memory device 140 can fetch a portion of the overall data word. As non-limiting examples, a specific memory device can provide or receive, respectively, 8 bits of a 128-bit data word for a Read or Write transaction, or 8 bits or 16 bits (depending for a x8 or a x16 device) of a 256-bit data word. The remaining bits of the word are provided or received by other memory devices in parallel.

In one embodiment, memory devices 140 can be organized into memory modules 170. In one embodiment, memory modules 170 represent dual inline memory modules (DIMMs). Memory modules 170 can include multiple memory devices 140, and the memory modules can include support for multiple separate channels to the included memory devices disposed on them.

Memory devices 140 each include memory resources 160. Memory resources 160 represent individual arrays of memory locations or storage locations for data. Typically, memory resources 160 are managed as rows of data, accessed via word line (rows) and bit line (individual bits within a row) control. Memory resources 160 can be organized as separate banks of memory. Banks 192 may refer to arrays of memory locations within a memory device 140. In one embodiment, banks of memory are divided into sub-banks with at least a portion of shared circuitry (e.g., drivers, signal lines, control logic) for the sub-banks.

In one embodiment, memory devices 140 include one or more registers 144. Register 144 represents one or more storage devices or storage locations that provide configuration or settings for the operation of the memory device. In one embodiment, register 144 can provide a storage location for memory device 140 to store data for access by memory controller 120 as part of a control or management operation. In one embodiment, register 144 includes one or more Mode Registers. In one embodiment, register 144 includes one or more multipurpose registers. The configuration of locations within register 144 can configure memory device 140 to operate in different "mode," where command information can trigger different operations within memory device 140 based on the mode. Additionally, or in the alternative, different modes can also trigger different operation from address information or other signal lines depending on the mode. Settings of register 144 can indicate configuration for I/O settings (e.g., timing, termination, driver configuration, or other I/O settings).

Memory controller 120 includes scheduler 110, which represents logic or circuitry to generate and order transactions to send to memory device 140. From one perspective, the primary function of memory controller 120 is to schedule memory access and other transactions to memory device 140. Such scheduling can include generating the transactions themselves to implement the requests for data by processor 112 and to maintain integrity of the data (e.g., such as with commands related to refresh).

Transactions can include one or more commands, and result in the transfer of commands or data or both over one or multiple timing cycles such as clock cycles or unit intervals. Transactions can be for access such as read or write or related commands or a combination, and other transactions can include memory management commands for configuration, settings, data integrity, or other commands or a combination.

Memory controller 120 typically includes logic to allow selection and ordering of transactions to improve performance of system 100. Thus, memory controller 120 can select which of the outstanding transactions should be sent to memory device 140 in which order, which is typically achieved with logic much more complex than a simple first-in first-out algorithm. Memory controller 120 manages the transmission of the transactions to memory device 140, and manages the timing associated with the transaction. In one embodiment, transactions have deterministic timing, which can be managed by memory controller 120 and used in determining how to schedule the transactions.

Referring again to memory controller 120, memory controller 120 includes command (CMD) logic 124, which represents logic or circuitry to generate commands to send to memory devices 140. The generation of the commands can refer to the command prior to scheduling, or the preparation of queued commands ready to be sent. Generally, the signaling in memory subsystems includes address information within or accompanying the command to indicate or select one or more memory locations where the memory devices should execute the command. In response to scheduling of transactions for memory device 140, memory controller 120 can issue commands via I/O 122 to cause memory device 140 to execute the commands. Memory controller 120 can implement compliance with standards or specifications by access scheduling and control.

Referring again to logic 180 and data buffer 150, in one embodiment, logic 180 buffers certain signals 182 from the host to memory devices 140. In one embodiment, data buffer 150 buffers data (DQ) signal lines 136 as data 186, and buffers command (or command and address) lines of CMD 134 as CMD 184. In one embodiment, data 186 is buffered, but includes the same number of signal lines as data 136. Thus, both are illustrated as having X signal lines. In contrast, CMD 134 has fewer signal lines than CMD 184. Thus, P>N. The N signal lines of CMD 134 are operated at a data rate that is higher than the P signal lines of CMD 184. For example, P can equal 2N, and CMD 184 can be operated at a data rate of half the data rate of CMD 134.

In one embodiment, memory controller 120 includes refresh logic 126. Refresh logic 126 can be used for memory resources 160 that are volatile and need to be refreshed to retain a deterministic state. In one embodiment, refresh logic 126 indicates a location for refresh, and a type of refresh to perform. Refresh logic 126 can execute external refreshes by sending refresh commands. For example, in one embodiment, system 100 supports all bank refreshes as well as per bank refreshes. All bank refreshes cause the refreshing of a selected bank 192 within all memory devices 140 coupled in parallel. Per bank refreshes cause the refreshing of a specified bank 192 within a specified memory device 140.

System 100 can include a memory circuit, which can be or include logic 180. To the extent that the circuit is considered to be logic 180, it can refer to a circuit or component (such as one or more discrete elements, or one or more elements of a logic chip package) that buffers the command bus. To the extent the circuit is considered to include logic 180, the circuit can include the pins of packaging of the one or more components, and may include the signal lines. The memory circuit includes an interface to the N signal lines of CMD 134, which are to be operated at a first data rate. The N signal lines of CMD 134 are host-facing with respect to logic 180. The memory circuit can also include an interface to the P signal lines of CMD 184, which are to be operated at a second data rate lower than the first data rate. The P signal lines of CMD 184 are memory-facing with respect to logic 180. Logic 180 can either be considered to be the control logic that receives the command signals and provides them to the memory devices, or can include control logic within it (e.g., its processing elements or logic core) that receive the command signals and provide them to the memory devices.

Memory controller 120 includes I/O training logic 128. I/O training logic 128 refers to logic in the memory controller 120 to execute training of I/O interconnections between memory controller 120 and memory devices 140. Training can refer to the application of different settings to determine a setting that provides improved signaling quality. Training can include iterative operation to test different settings, which can include voltage settings, timing settings, or other settings, or a combination. I/O training logic 128 can set the parameters associated with transceivers of I/O 142 and I/O 122. I/O training logic 128 enables differential CRC/DQS strobe signal training.

Training can refer to the testing and setting of electrical parameters or timing parameters or both that control a data signal eye. The data signal eye refers to timing and shape of rising and falling edges, on average, for a signal. The height and width of the eye provides compliance with timing and voltage level requirements needed to trigger a logic value on the signal line or a change in logic value, or both I/O training logic 128 can enable the testing of various signaling parameters to test the signaling of various signal lines in the interface between memory controller 120 and memory devices 140. Logic 180 and data buffer 150 samples signal lines for the testing and provides feedback to the memory controller 120 to identify what settings provide signaling characteristics that will enable the devices to exchange information, such as commands from the memory controller and data.

In one embodiment, based on a command from command logic 124, data buffer 150 can enter a CRC training mode. The CRC training mode enables system 100 to combine CRC training with DQ training on the host interface between the memory controller 120 and the data buffer 150.

Figure 2:
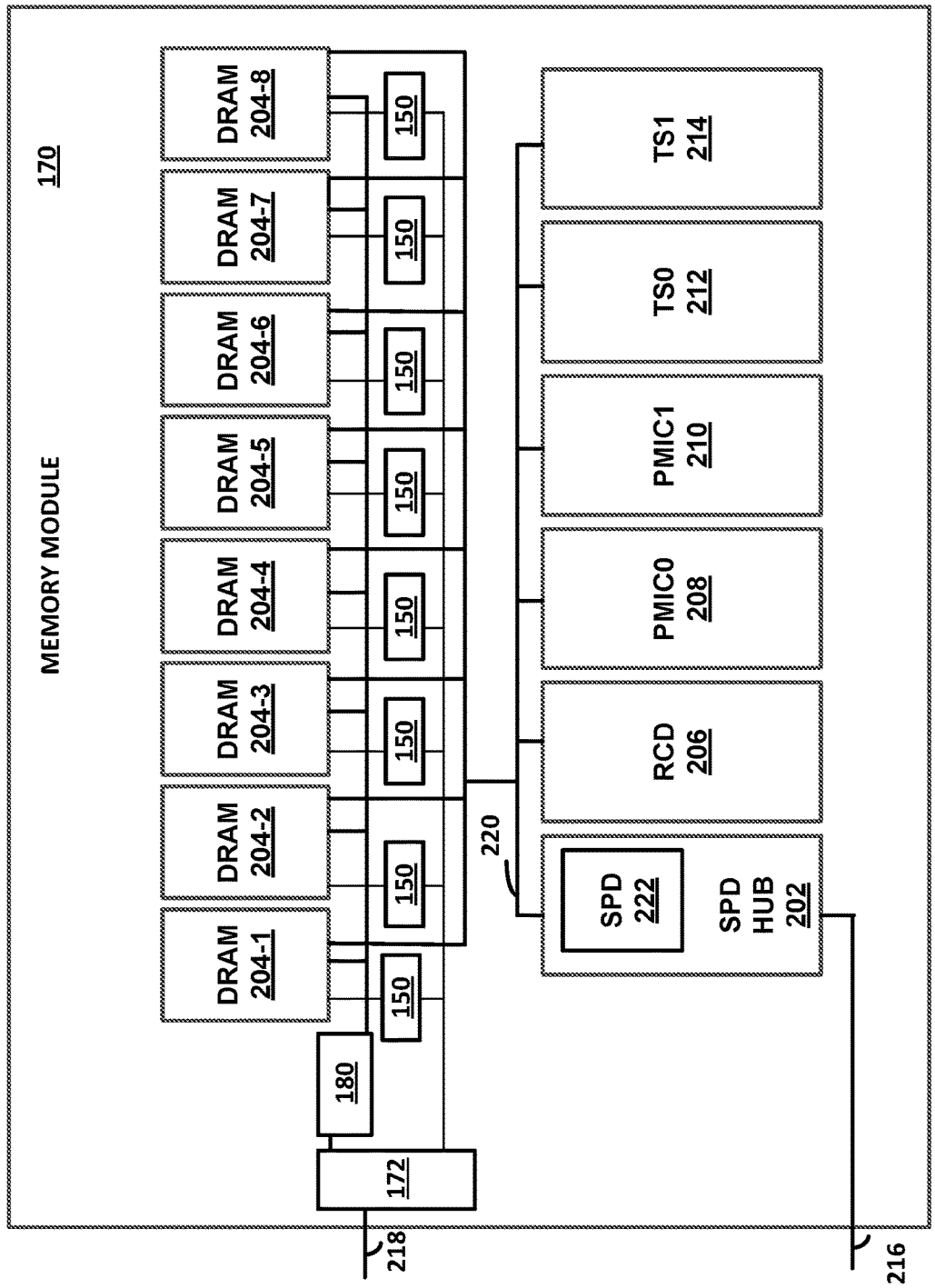
FIG. 2 is a block diagram of the memory module in FIG. 1 that includes a plurality of Dynamic Random Access Memory (DRAM) chips and a plurality of data buffers.

FIG. 2 is a block diagram of the memory module 170 in FIG. 1 that includes a plurality of Dynamic Random Access Memory (DRAM) chips 204-1, . . . , 204-8 and a plurality of data buffers 150. A host system communicates with the DRAM chips 204-1, . . . , 204-8 via a memory bus 218. Memory bus 218 includes CLK 132, CMD 134, DATA 136 and CTRL 138 signals discussed in conjunction with FIG. 1. Each of the Dynamic Random Access Memory (DRAM) chips 204-1, . . . , 24-8 is communicatively coupled to one of the plurality of data buffers 150.

The memory module 170 communicates with a host system via a sideband bus 216. The sideband bus 216 may be compatible with the JESD403-1 JEDEC (Joint Electronic Device Engineering Council) Module Sideband Bus standard that is a subset and superset of the MIPI Alliance™ I3C Basic℠ serial bus standard, MIPI Alliance™ I3C bus.

The memory module 170 has two temperature sensors (TS), a first temperature sensor TS0 212 and a second temperature sensor TS1 214, to measure the temperature of the DRAM chips 204-1, . . . , 204-8 on the memory module 170. The memory module 170 includes two Power Management ICs (PMICs) PMIC0 208, PMIC1 210, a Registering Clock Driver (RCD) 206, and a Sideband Bus Device Hub (SPD Hub) 202 that includes a Serial Presence Detect (SPD) device 222 which acts as the SPD to redrive the sideband bus 216 to a local bus 220 for the Power Management ICs (PMICs) PMIC0 208, PMIC1 210, a Registering Clock Driver (RCD) 206 and the first temperature sensor TS0 212 and the second temperature sensor TS8 214.

Figure 3:
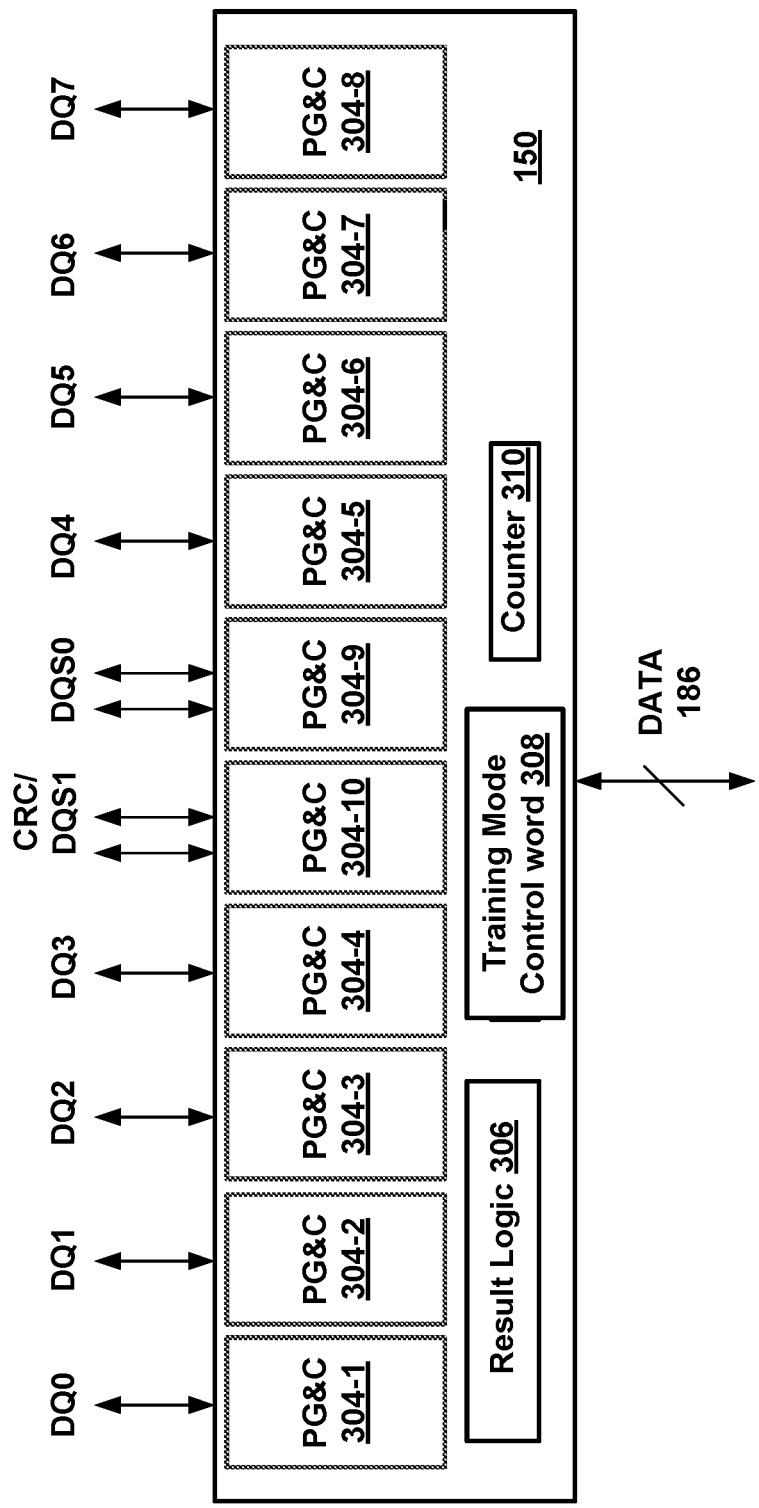
FIG. 3 is a block diagram of an embodiment of one of the plurality of data buffers on the memory module in FIG. 1 to combine CRC training for the differential CRC/DQS strobe signal with DQ training on the DQ signals on the interface between the memory controller and the data buffer on the memory module.

FIG. 3 is a block diagram of an embodiment of one of the plurality of data buffers 150 on the memory module 170 in FIG. 1 to combine CRC training for the differential CRC/DQS strobe signal with DQ training on the DQ signals on the interface between the memory controller 120 and the data buffer 150 on the memory module 170.

In the embodiment shown in FIG. 3, each data signal (also referred to as a data lane) (DQ0-DQ7), the differential CRC/DQS strobe signal (also referred to as a CRC signal line) and the differential DQS1 strobe signal has a respective pattern generator and checker (PG & C) 304-1, . . . 304-10.

Each pattern generator and checker 304-1, . . . 304-10 includes a pattern generator and a checker. The pattern generator is a simple fixed pattern linear feedback shift register (LFSR). In an embodiment, the linear feedback shift register has 16-bits. In other embodiments, the linear feedback shift register has more than 16-bits, for example, 32-bits or more than 32-bits. The pattern generator in each pattern generator and checker 304-1, . . . 304-10 is used for CRC read training mode for the CRC/DQS strobe signal and the data signals. The pattern checker in each pattern generator and checker 304-1, . . . 304-10 is used for CRC write training mode for the CRC/DQS strobe signal and the data signals.

To support higher frequency operation, each DQ lane and the CRC lane can support unique pattern configuration. The pattern options include a 16-bit serial repeating pattern or a single 16-bit LFSR pattern with a single seed. In one embodiment, the pattern is duplicated per DQ lane and for the CRC lane. In another embodiment, the pattern generated by the pattern generator in each of the pattern generator and checkers (PG & C) 304-1, . . . 304-10 can be different.

The pattern is used for either the comparison during Host Interface Write (HIW) training and CRC Write Training Mode (CWTM) or to generate the pattern during Host Interface Read (HIR) training and RCE Read Training Mode (CRTM). In an embodiment, the polynomial for the 16-bit LFSR is the same as the polynomial used for RCD (Registering Clock Driver) Duty Cycle Adjuster (DCA) Decision Feedback Equalization (DFE) Training in the memory module 170.

While CRC pattern checking is enabled, the errors accumulated in the test can be counted or per-Unit Interval (UI) error counting can be filtered during the pattern comparison. Pattern generation and checking can be enabled for all DQ pins. CRC pattern checking in combination with other automatic sweep support for reference voltage (Vref) or host-side parameter sweeps enable measuring the eye height and/or eye width. The data buffer 150 can store eye heights and include circuitry to select the largest eye height for automated updates of the training values for eye height and/or eye width.

The CRC lane ensures data integrity/link protection between the memory controller 120 and the memory module 170. The interface between the memory controller 120 and the data buffer 150 in the memory module 170 can be trained without interfering with data stored in the memory device 140. Periodic training of the signaling (CRC signal line and the multiple data (DQ) signal lines) can be performed during normal operation of the system on the interface between the memory controller 120 and the data buffer in the memory module without disturbing the data stored in the memory device and allowing self-refresh of the memory device 140.

The data buffer 150 includes result logic 306 to store the results, which enables efficient automation of final settings in a receiver of the data buffer 150. The data buffer also includes a training mode control word 308 to enable CRC training mode and an error counter 310 to store errors based on the comparison of received write data with expected write data. The error counter 310 can be used to count errors per DQ lane and/or CRC errors and/or per phase errors.

After the CRC lane has been trained, the CRC lane can be used as CRC for data integrity. For each read from the memory resources 160 in the memory device 140, a read data pattern is returned on the CRC lane while the data stored in the memory resources is returned on the DQ lanes. For each write to memory resources 160, the CRC write data is compared in the data buffer 150. The CRC timing aligns directly with the DQ data. The CRC is computed in groups of 8 Unit Intervals per pseudo channel. When the pseudo channels are staggered, this is reflected in the CRC bits. A transaction with CRC is delayed by 4 Unit Intervals when compared to the transaction without CRC.

Figure 4:
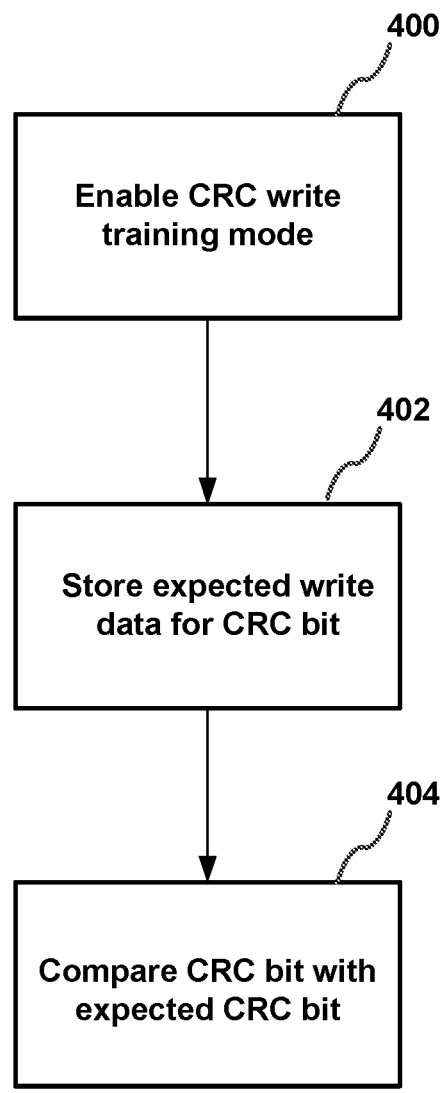
FIG. 4 is a flowgraph illustrating a method to perform CRC Write Training in the data buffer shown in FIG. 3.

FIG. 4 is a flowgraph illustrating a method to perform CRC Write Training in the data buffer 150 shown in FIG. 3. CRC Write Training performs write training on the differential CRC/DQS1 strobe signal. Write patterns for the CRC CRC/DQS1 strobe signal (also referred to as the CRC lane or CRC bit) are compared within the data buffer 150.

At block 400, the memory controller 120 enables CRC write training mode in the training mode control word 308.

At block 402, data pattern control words in the data buffer 150 are written with the expected CRC bit from the memory controller 120.

At block 404, the CRC bit received from the memory controller 120 is compared with the expected CRC bit in the data buffer 150.

Figure 5:
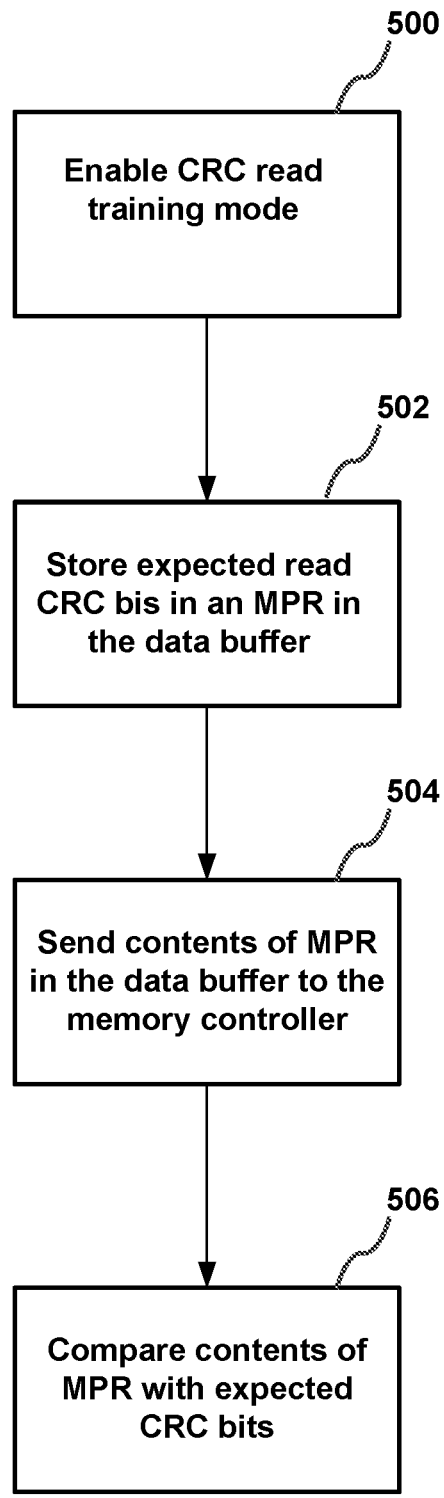
FIG. 5 is a flowgraph illustrating a method to perform CRC Read Training in the data buffer shown in FIG. 3.

FIG. 5 is a flowgraph illustrating a method to perform CRC Read Training in the data buffer 150 shown in FIG. 3. CRC Read Training performs read training on the differential CRC/DQS strobe signal.

At block 500, the memory controller 120 enables CRC Read Training Mode in the training mode control word 308.

At block 502, data pattern control words in the data buffer 150 are written with the CRC bit from the memory controller 120.

At block 504, the CRC bit stored in the data pattern control words in the data buffer 150 are read by the memory controller.

At block 506, the memory controller 120 compares the CRC bit read from the data buffer 150 with the CRC bit written to the data buffer 150.

Figure 6:
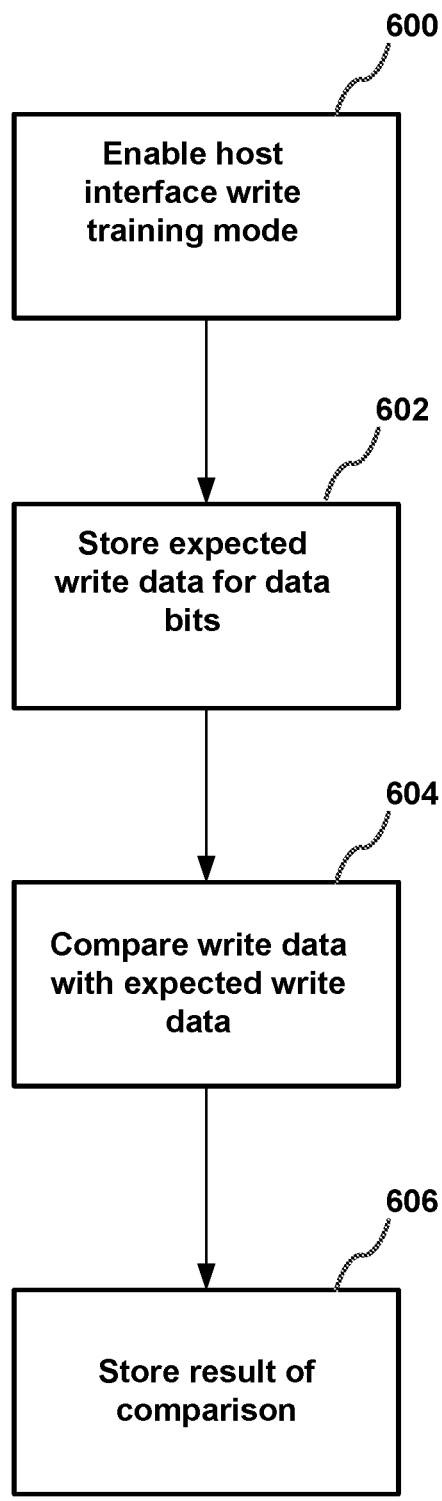
FIG. 6 is a flowgraph illustrating a method to perform both CRC Write Training and Host Interface Write Training in the data buffer shown in FIG. 3.

FIG. 6 is a flowgraph illustrating a method to perform both CRC Write Training and Host Interface Write Training in the data buffer 150 shown in FIG. 3. The CRC Write Training of the CRC/DQS1 bit is combined with the Host Interface Write Training of DQ bits on the host interface which reduces training time and boot time. Write patterns for all DQ lanes and the CRC lane are compared within the data buffer 150. No data is written to the memory device 140.

Host Interface Write training mode enables periodic training and margining on the host interface between the memory controller 120 and the data buffer 150 without disturbing the data stored in the memory resources 160. CRC training is performed as part of the regular Write DQ/DQS alignment algorithms.

At block 600, the memory controller 120 enables both host interface write training mode and CRC write training mode through an in-band write operation to the training mode control word 308. In another embodiment, the training mode control word 308 can be written through the sideband bus 216.

At block 602, data pattern control words in the data buffer 150 are written with the expected write data and CRC bit from the memory controller 120.

At block 604, the write data received from the memory controller 120 is compared with expected write data in the data buffer 150.

At block 606, the result of the comparison of the received write data with the expected write data is stored in a counter (the counter value can be referred to as training status or error status) that can be read by the memory controller 120. The counter value (data) stored in the counter can be read by the memory controller 120. To read the pattern checker output, the error counter 310 can be read by sending a mode register read command to the error counter 310, or by sending a read through the sideband bus 216 to the error counter 310. Any error within the data buffer 150 can be sent to the RCD 206 through an ALERT_N pin and the memory controller 120 can take an action accordingly. Alternatively, the sideband bus 216 can be used for training status/error checking data during/after the training with some static reads. The sideband bus 216 can also be used to send write and read of a configuration register within the data buffer 150.

In an embodiment with a 32-bit counter, a 32-bit counter value is sent to the memory controller 120, with the Least Significant Bit (LSB) of the counter value sent in unit interval 0 and the Most Significant Bit of the counter value sent in unit interval 31. After the counter value is read, the counter is reset to 0 (that is, cleared). A subsequent read will result in reading a counter value of 0, until additional writes have been sent that incur comparison errors.

Figure 7:
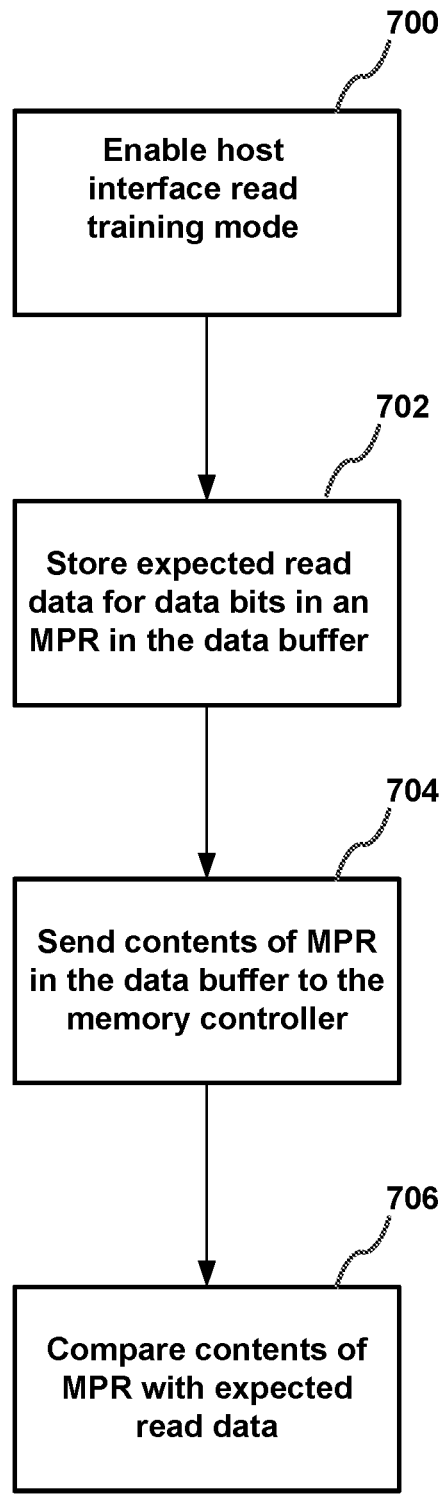
FIG. 7 is a flowgraph illustrating a method to perform both CRC Read Training and Host Interface Read Training in the data buffer shown in FIG. 3.

FIG. 7 is a flowgraph illustrating a method to perform both CRC Read Training and Host Interface Read Training in the data buffer 150 shown in FIG. 3. The CRC Read Training of the CRC/DQS1 bit is combined with the Host Interface Read Training of DQ bits on the host interface which reduces training time and boot time. All DQ lanes [7:0] and the CRC generate read data based on the read pattern configuration. CRC training is performed as part of the regular Read DQ/DQS alignment algorithms.

At block 700, the memory controller 120 enables both Host Interface Read Training mode and CRC Read Training Mode in the training mode control word 308. The training mode control word 308 can be written either through the sideband bus 216 or through in-band operations such as mode register write command to the data buffer 150.

At block 702, data pattern control words in the data buffer 150 are written with the read data and CRC bit from the memory controller 120.

At block 704, the expected read data and CRC bit stored in the data pattern control words in the data buffer 150 are read by the memory controller 120.

At block 706, the memory controller 120 compares the read data and the CRC bit read from the data buffer 150 with the expected read data and the CRC bit written to the data buffer 150.

Host preamble training can be used during the Host Interface Read Training and CRC Read training described in conjunction with FIG. 7. Host preamble training changes the read strobe behavior such that the strobes are driven by the data buffer 150 and only toggle during a preamble plus the burst of the read data.

Figure 8:
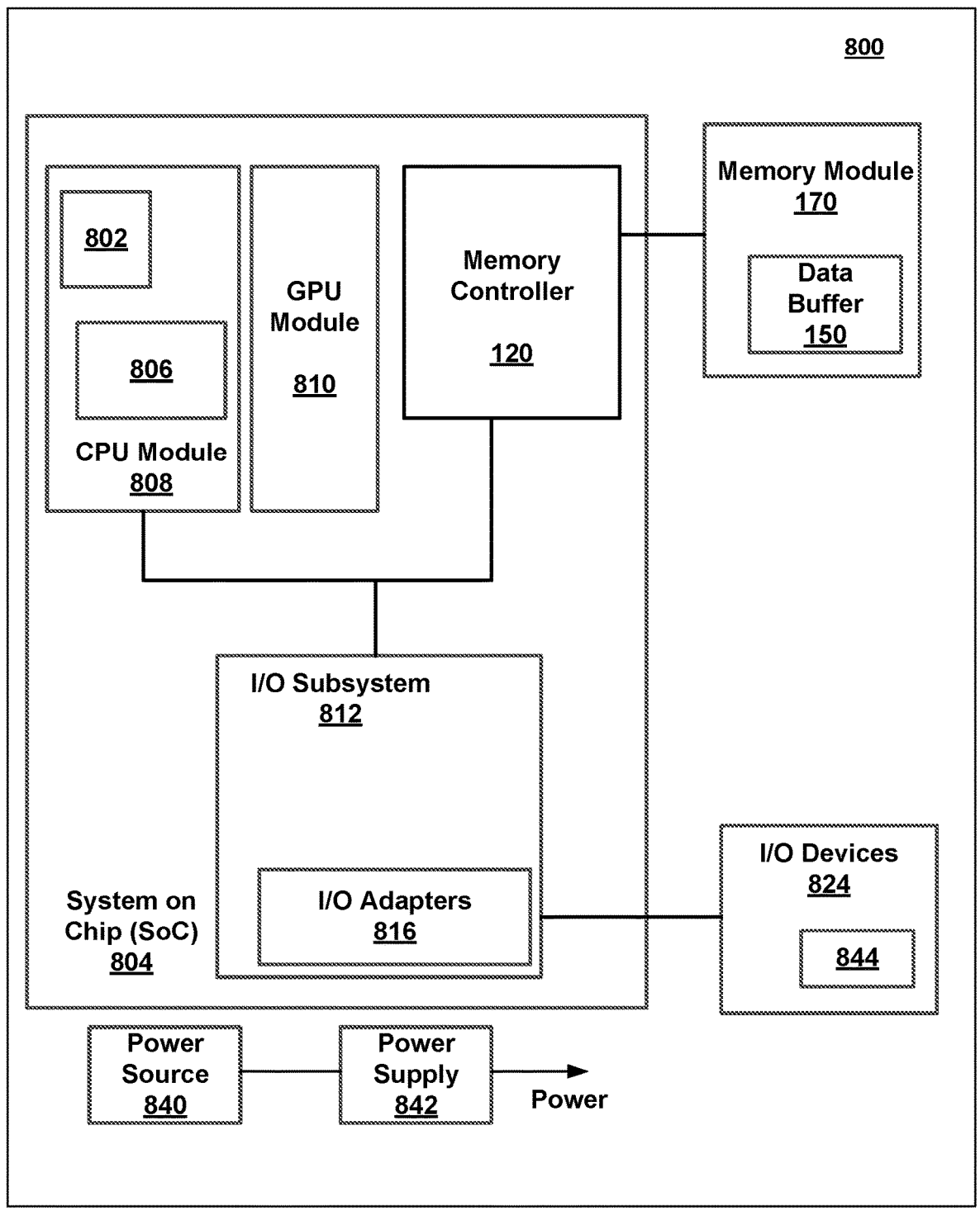
FIG. 8 is a block diagram of an embodiment of a computer system that includes the data buffer in the memory module shown in FIG. 1.

FIG. 8 is a block diagram of an embodiment of a computer system 800 that includes the data buffer 150 in the memory module 170 shown in FIG. 1. Computer system 800 can correspond to a computing device including, but not limited to, a server, a workstation computer, a desktop computer, a laptop computer, and/or a tablet computer.

The computer system 800 includes a system on chip (SOC or SoC) 804 which combines processor, graphics, memory, and Input/Output (I/O) control logic into one SoC package. The SoC 804 includes at least one Central Processing Unit (CPU) module 808, a memory controller 120, and a Graphics Processor Unit (GPU) 810. In other embodiments, the memory controller 120 can be external to the SoC 804. The CPU module 808 includes at least one processor core 802, and a level 2 (L2) cache 806.

Although not shown, each of the processor core(s) 802 can internally include one or more instruction/data caches, execution units, prefetch buffers, instruction queues, branch address calculation units, instruction decoders, floating point units, retirement units, etc. The CPU module 808 can correspond to a single core or a multi-core general purpose processor, such as those provided by Intel® Corporation, according to one embodiment.

The Graphics Processor Unit (GPU) 810 can include one or more GPU cores and a GPU cache which can store graphics related data for the GPU core. The GPU core can internally include one or more execution units and one or more instruction and data caches. Additionally, the Graphics Processor Unit (GPU) 810 can contain other graphics logic units that are not shown in FIG. 8, such as one or more vertex processing units, rasterization units, media processing units, and codecs.

Within the I/O subsystem 812, one or more I/O adapter(s) 816 are present to translate a host communication protocol utilized within the processor core(s) 802 to a protocol compatible with particular I/O devices. Some of the protocols that adapters can be utilized for translation include Peripheral Component Interconnect (PCI)-Express (PCIe); Universal Serial Bus (USB); Serial Advanced Technology Attachment (SATA) and Institute of Electrical and Electronics Engineers (IEEE) 1594 "Firewire".

The I/O adapter(s) 816 can communicate with external I/O devices 824 which can include, for example, user interface device(s) including a display and/or a touch-screen display 844, printer, keypad, keyboard, communication logic, wired and/or wireless, storage device(s) including hard disk drives ("HDD"), solid-state drives ("SSD"), removable storage media, Digital Video Disk (DVD) drive, Compact Disk (CD) drive, Redundant Array of Independent Disks (RAID), tape drive or other storage device. The storage devices can be communicatively and/or physically coupled together through one or more buses using one or more of a variety of protocols including, but not limited to, SAS (Serial Attached SCSI (Small Computer System Interface)), PCIe (Peripheral Component Interconnect Express), NVMe (NVM Express) over PCIe (Peripheral Component Interconnect Express), and SATA (Serial ATA (Advanced Technology Attachment)). The display 844 to display data stored in the plurality of memory devices in the memory module 170.

Additionally, there can be one or more wireless protocol I/O adapters. Examples of wireless protocols, among others, are used in personal area networks, such as IEEE 802.15 and Bluetooth, 4.0; wireless local area networks, such as IEEE 802.11-based wireless protocols; and cellular protocols.

Power source 840 provides power to the components of system 800. More specifically, power source 840 typically interfaces to one or multiple power supplies 842 in system 800 to provide power to the components of system 800. In one example, power supply 842 includes an AC to DC (alternating current to direct current) adapter to plug into a wall outlet. Such AC power can be renewable energy (e.g., solar power) power source 840. In one example, power source 840 includes a DC power source, such as an external AC to DC converter. In one example, power source 840 or power supply 842 includes wireless charging hardware to charge via proximity to a charging field. In one example, power source 840 can include an internal battery or fuel cell source.

Flow diagrams as illustrated herein provide examples of sequences of various process actions. The flow diagrams can indicate operations to be executed by a software or firmware routine, as well as physical operations. In one embodiment, a flow diagram can illustrate the state of a finite state machine (FSM), which can be implemented in hardware and/or software. Although shown in a particular sequence or order, unless otherwise specified, the order of the actions can be modified. Thus, the illustrated embodiments should be understood as an example, and the process can be performed in a different order, and some actions can be performed in parallel. Additionally, one or more actions can be omitted in various embodiments; thus, not all actions are required in every embodiment. Other process flows are possible.

To the extent various operations or functions are described herein, they can be described or defined as software code, instructions, configuration, and/or data. The content can be directly executable ("object" or "executable" form), source code, or difference code ("delta" or "patch" code). The software content of the embodiments described herein can be provided via an article of manufacture with the content stored thereon, or via a method of operating a communication interface to send data via the communication interface. A machine readable storage medium can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications can be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A memory module comprising:
   a hardware interface to interface with a command bus and a data bus having multiple data (DQ) signal lines and a CRC signal line, the hardware interface to receive a command on the command bus to trigger training of signaling on the multiple data (DQ) signal lines and the CRC signal line that includes testing and setting of electrical parameters or timing parameters that control respective data signal eyes for signaling on each of the multiple data (DO) signal lines and on the CRC signal line; and
   a data buffer to include pattern generation and checking circuitry for each of the multiple data (DQ) signal lines and the CRC signal line to perform the training of signaling on the multiple data (DQ) signal lines and the CRC signal line, wherein the testing and setting of electrical parameters or timing parameters that control respective data signal eyes for the signaling on each of the multiple data (DO) signal lines and on the CRC signal line occurs without interfering with data stored in a memory integrated circuit.

2. The memory module of claim 1, wherein the memory integrated circuit is included in the memory module and coupled with the data buffer.

3. The memory module of claim 1, wherein the training of signaling is performed during normal operation of the memory module.

4. The memory module of claim 2, wherein the training of signaling performed prior to enabling normal operation of the memory integrated circuit.

5. The memory module of claim 1, wherein the training of the CRC signal line and the training of the multiple data (DQ) signal lines are performed in parallel.

6. The memory module of claim 1, wherein the CRC signal line is a differential data strobe (DQS) signal line.

7. The memory module of claim 1, wherein a number of data signal lines is 8.

8. The memory module of claim 2, wherein the memory integrated circuit is a Dynamic Random Access Memory (DRAM) and the memory module is a Load Reduced Double Data Rate Dual In-Line Memory Module (LR-DIMM).

9. A memory controller comprising:
   command logic to generate a command to train signaling on a data bus of a memory module, the data bus having multiple data (DQ) signal lines and a CRC signal line; and
   a hardware interface to interface with a command bus, the hardware interface to send the command to the memory module, the memory module comprising a data buffer, the data buffer to include pattern generation and checking circuitry for each of the multiple data (DQ) signal lines and the CRC signal line to perform training of signaling on the multiple data (DQ) signal lines and the CRC signal line that includes testing and setting of electrical parameters or timing parameters that control respective data signal eyes for signaling on each of the multiple data (DQ) signal lines and on the CRC signal line, wherein the testing and setting of electrical or timing parameters occurs without interfering with data stored in a memory integrated circuit.

10. The memory controller of claim 9, wherein the memory module comprising the memory integrated circuit to store data.

11. The memory controller of claim 9, wherein training of signaling is performed during normal operation of the memory module.

12. The memory controller of claim 10, wherein training of signaling performed prior to enabling normal operation of the memory integrated circuit.

13. The memory controller of claim 9, wherein training of the CRC signal line and training of the multiple data (DQ) signal lines are performed in parallel.

14. The memory controller of claim 9, wherein the CRC signal line is a differential data strobe (DQS) signal line.

15. The memory controller of claim 9, wherein a number of data signal lines is 8.

16. The memory controller of claim 9, wherein the memory integrated circuit is a Dynamic Random Access Memory (DRAM) and the memory module is an Load Reduced Double Data Rate Dual In-Line Memory Module (LR-DIMM).

17. A system comprising:
- a memory controller; and
- a memory module, the memory module comprising:
  - a hardware interface to interface with a command bus and a data bus having multiple data (DQ) signal lines and a CRC signal line, the hardware interface to receive a command from the memory controller on the command bus to trigger training of signaling on the multiple data (DQ) signal lines and the CRC signal line that includes testing and setting of electrical parameters or timing parameters that control respective data signal eyes for signaling on each of the multiple data (DQ) signal lines and on the CRC signal line; and
  - a data buffer to include pattern generation and checking circuitry for each of the multiple data (DQ) signal lines and the CRC signal line to perform the training of signaling on the multiple data (DQ) signal lines and the CRC signal line, wherein the testing and setting of electrical parameters or timing parameters that control respective data signal eyes for the signaling on each of the multiple data (DQ) signal lines and on the CRC signal line occurs without interfering with data stored in a memory integrated circuit.

18. The system of claim 17, wherein the training of the CRC signal line and the training of the multiple data (DQ) signal lines are performed in parallel and the CRC signal line is a differential data strobe (DQS) signal line.

19. The system of claim 17, wherein the memory integrated circuit is included in the memory module and coupled with the data buffer, the training of signaling performed prior to enabling normal operation of the memory integrated circuit.

20. The system of claim 17, further comprising one or more of:
- at least one processor communicatively coupled to the memory controller;
- a display communicatively coupled to at least one processor; or
- a battery to power the system.

\* \* \* \* \*

UNITED STATES PATENT AND TRADEMARK OFFICE
CERTIFICATE OF CORRECTION

| | |
|---|---|
| PATENT NO. | : 12,470,231 B2 |
| APPLICATION NO. | : 17/688125 |
| DATED | : November 11, 2025 |
| INVENTOR(S) | : Tonia M. Rose and Saravanan Sethuraman |

Page 1 of 1

It is certified that error appears in the above-identified patent and that said Letters Patent is hereby corrected as shown below:

In the Claims

Claim 1 should read: A memory module comprising:
    a hardware interface to interface with a command bus and a data bus having multiple data (DQ) signal lines and a CRC signal line, the hardware interface to receive a command on the command bus to trigger training of signaling on the multiple data (DQ) signal lines and the CRC signal line that includes testing and setting of electrical parameters or timing parameters that control respective data signal eyes for signaling on each of the multiple data (DQ) signal lines and on the CRC signal line; and
    a data buffer to include pattern generation and checking circuitry for each of the multiple data (DQ) signal lines and the CRC signal line to perform the training of signaling on the multiple data (DQ) signal lines and the CRC signal line, wherein the testing and setting of electrical parameters or timing parameters that control respective data signal eyes for the signaling on each of the multiple data (DQ) signal lines and on the CRC signal line occurs without interfering with data stored in a memory integrated circuit.

Signed and Sealed this
Twenty-third Day of December, 2025

John A. Squires
*Director of the United States Patent and Trademark Office*